US010180666B2

(12) United States Patent
Satani

(10) Patent No.: US 10,180,666 B2
(45) Date of Patent: Jan. 15, 2019

(54) COGNITIVELY OPERATED SYSTEM

(71) Applicant: Abhijeet R. Satani, Gujarat (IN)

(72) Inventor: Abhijeet R. Satani, Gujarat (IN)

(*) Notice: Subject to any disclaimer, the term of this patent is extended or adjusted under 35 U.S.C. 154(b) by 205 days.

(21) Appl. No.: 15/110,858

(22) PCT Filed: Jan. 1, 2015

(86) PCT No.: PCT/IB2015/050007
§ 371 (c)(1),
(2) Date: Jul. 11, 2016

(87) PCT Pub. No.: WO2015/104647
PCT Pub. Date: Jul. 16, 2015

(65) Prior Publication Data
US 2016/0327918 A1 Nov. 10, 2016

(30) Foreign Application Priority Data
Jan. 13, 2014 (IN) .......................... 113/MUM/2014

(51) Int. Cl.
*G05B 13/02* (2006.01)
*H04L 29/08* (2006.01)
(Continued)

(52) U.S. Cl.
CPC .......... *G05B 13/027* (2013.01); *G06F 3/015* (2013.01); *G06N 3/08* (2013.01); *H04L 67/141* (2013.01)

(58) Field of Classification Search
CPC ........ G05B 13/027; G06F 3/015; G06N 3/08; H04L 67/141
(Continued)

(56) References Cited

U.S. PATENT DOCUMENTS

2003/0176806 A1* 9/2003 Pineda ................. G06F 3/015
600/544
2007/0173733 A1 7/2007 Le et al.
(Continued)

OTHER PUBLICATIONS

Authorized Officer: Blaine Copenheaver, "International Search Report" issued in counterpart International Patent Application No. PCT/IB2015/050007, dated Sep. 14, 2015, Publisher: PCT.
(Continued)

*Primary Examiner* — Robert A Cassity
(74) *Attorney, Agent, or Firm* — Kaplan Breyer Schwarz, LLP

(57) ABSTRACT

The present subject matter provides: a server and a method thereof; a communication device and a method thereof; and a controlled device and a method thereof. The present subject matter provides capturing of modification caused by the neural signals on a first signal. The present subject matter provides generation and broadcasting of the first signal which interacts with the neural signal. The neural signals correspond to instructions to operate a controlled device. The interaction between the first signal and neural signal causes modification of some characteristics of the first signal, resulting in a second signal. The second signal is than captured and analyzed for generating a command corresponding to the second signal. The command is reflective of the instructions to operate the controlled device and the subject matter provides causing the controlled device to operate according to the command.

15 Claims, 4 Drawing Sheets

(51) Int. Cl.
*G06F 3/01* (2006.01)
*G06N 3/08* (2006.01)

(58) Field of Classification Search
USPC .......................................................... 700/49
See application file for complete search history.

(56) References Cited

U.S. PATENT DOCUMENTS

| | | |
|---|---|---|
| 2010/0010288 A1 | 1/2010 | Von Ohlsen et al. |
| 2012/0078132 A1 | 3/2012 | Zdeblick et al. |
| 2012/0149467 A1* | 6/2012 | Heck ..................... A63F 13/235 |
| | | 3/235 |
| 2013/0151450 A1 | 6/2013 | Ponulak |
| 2015/0148863 A1* | 5/2015 | Yun .................... A61N 1/36025 |
| | | 607/45 |

OTHER PUBLICATIONS

Authorized Officer: Blaine Copenheaver, "Written Opinion of the International Search Authority" issued in counterpart International Patent Application No. PCT/IB2015/050007, dated Sep. 14, 2015, Publisher: PCT.
Authorized Officer: Cecile Chatel, "International Preliminary Report on Patentability" issued in counterpart PCT Application No. PCT/IB2015/050007, dated Jul. 19, 2016, Publisher: PCT.

* cited by examiner

COGNITIVELY OPERATED SYSTEM

TECHNICAL FIELD

The present subject matter relates to cognitive operated system.

BACKGROUND

Developing a device that may be operated by thinking without requiring any physical action has attracted attention of many researchers and corporations. While some devices have been demonstrated by some research organizations and corporations, yet these devices are in a very nascent state of development and often fail to perform for a number of reasons. One reason being that these devices are not truly cognitive operated devices instead these devices are concentration based devices. That is to operate these devices a user must concentrate hard for operating these devices. Another limitation with these devices is that the devices require heavy a headgear that a user must wear for using the device, some of such devices are NUEROSKY®, EMOTIVE®, CNET®, BRAINDRIVER®, NECOMIMI AND SHIPPO®. Another limitation with these devices is that, these devices fail to perform in real time.

Most devices attempt to achieve cognition-based operation often rely on catching waves emitted by the brain of a user. Captured waves are analyzed to identify a pattern in a processor. The pattern of the waves emitted by the brain is indicative of desire of the user. If the pattern corresponds to a predetermined wave pattern, the processor generates a command to operate the device. However, such systems or devices have a number of limitations, for example, the waves emitted by the brain are so weak that to catch this wave a user must wear a headgear and all the sensor required to catch the waves must be either be touch the brain of the user or must be in within the headgear at a very close proximity of the brain. Therefore, such devices require a user to wear a crown-like headgear which is often not practical. Furthermore, even with the headgear often these devices fail to perform. This is because for generating a wave pattern that has sufficient strength that may be captured, and has desired pattern— that is capable of cognitive commanding a device to operate— the user must concentrate hard. At least because of this reason, the cognitively operated devices have limited the users having extra-ordinary concentration power. Further these devices pre-configuration of device in which wave pattern corresponding to a command must be captured and recorded and the commands is selected only when wave patter is received.

SUMMARY

The present subject matter addresses above and other problems with the existing devices. The present subject substantially eliminates need of wearing any crown-like headgear. Further the present subject also provides a solution that works substantially in real-time. That is, the time lag between cognition and device operation is almost nil. Further, the present subject matter provides solution that may be employed for users with varied concentration ability and/or average concentration abilities. Further the present subject matter provides a smart solution that is capable of learning by observing a user.

The present subject matter provides: a server and a method thereof; a communication device and a method thereof; and a controlled device and a method thereof. The present subject matter captures—instead of capturing the waves emitted by the brain of a use, which are generally referred to as neural signals—, modification caused by the neural signals on a first signal. Effectively an interference of the neural signal and the first signal is recorded. The present subject matter provides generation and broadcasting of the first signal which interacts with the neural signal. The interaction between the first signal and neural signal causes modification of some characteristics of the first signal, resulting in a second signal. The second signal is interference of the neural signals and the first signal. The second signal is than captured and analyzed for generating a command corresponding to the second signal. Further the present subject matter provides intelligently generating new commands based on monitoring the second signal and controlled device. The present subject matter provides intelligently generating new commands and/or updating existing commands based on observation of the second signal and substantially simultaneous action of the user in relating with the controlled device. The new commands are generated based on correlation of the action and corresponding second signal. In some embodiments, historic data of correlation may be used to update and/or improve and/or generate new commands. This aspect of the present subject matter substantially reduces need of pre-configuration and requirement of capturing wave patterns corresponding to every command. In some embodiments, the present subject matter provides simply pairing of the controlled device and the user and commands are automatically generated and stored.

Because the strength of the first signal is independent of a user's ability to concentrate and can be controlled and modified therefore, the solution of the present subject matter becomes substantially independent of the user's ability to concentrate. Because the strength of the first signal can be controlled and the second signal is the derivative of the first signal and the neural signals therefore, the strength of the second signal may also be controlled hence the second signal may be captured without the need of any headgear. Furthermore, the requirement of the headgear is further substantially eliminated because, present subject matter does not require capturing the neural signals which are week and dissipate quickly with distance—instead the subject matter provides capturing of effects of the neural signals on the first signal by capturing the second signal. In fact, the present subject matter is substantially independent of the distance between the controlled device, server, communication device and the user. So long as, the second signal carrying information regarding the neural signals of a user may be captured, it does not matter where the user, the controlled device, the server, and the communication device are located. For example, in some embodiments of the present subject matter GSM modules and/or GPS modules may be implemented with any one or more of the server, the communication or the controlled device and the controlled device may be cognitively operated through satellite or other modes of communication such as mobile signal towers internet etc.

According to an aspect, the present subject matter provides a method. The method comprising: receiving a second signal at a server wherein, the second signal is a result of interaction of neural signals and a first signal, wherein the first signal is broadcasted from a communication device and the first signal is configured to interact with neural signals, and the second signal includes indicative of characteristics of the neural signals, and the neural signals correspond to instructions to operate a controlled device; generating a command based on the second signal, and the command is reflective of the instructions to operate the controlled device; and transmitting the command to cause the controlled device to operate. According to an embodiment, the receiving includes receiving the second signal from the communication device and method includes instructing the communication device to broadcast the first signal, wherein the server instructs the communication device and the first signal is configured to interact with neural signals and register indicatives of the characteristics of the neural signals on the first signal to generate the second signal and strength and range of the first signal and the second signal is independent of neural signals. According to another embodiment the receiving includes receiving at a processor of the server, a filtered second signal, the second signal and an amplified second signal. According to an embodiment, the method includes monitoring the second signal and in relation the controlled device and generating a new command based on correlation between the second signal and the controlled device operation and storing the new command in a predetermined set of commands. According to a further embodiment, the method includes deconvoluting the second signal at the processor, wherein deconvoluting includes comparing the filtered second signal, the second signal and the amplified second signal. According to yet a further embodiment, the generating the command includes mapping the second signal to a predetermined set of commands and selecting the command based on the second signal.

According to another aspect, the subject matter provides a server. The server comprising: a receiver configured to receive a second signal, wherein the second signal is a result of interaction of neural signals and a first signal, wherein the first signal is broadcasted from a communication device and the first signal is configured to interact with neural signals, and the second signal includes indicatives of characteristics of the neural signals, and the neural signals correspond to instructions to operate a controlled device; a processor to generate a command based on the second signal, and the command is reflective of the instructions to cause the controlled device to operate; and a transmitter to transmit the command to cause the controlled device to operate. According an embodiment, the processor configured to receive the second signal from the communication device and the processor instructs the communication device to broadcast the first signal, wherein the first signal is configured to interact with neural signals and register indicatives of the characteristics of the neural signals on the first signal to generate the second signal and strength and range of the first signal and the second signal is independent of neural signals. According to yet an embodiment, the server includes a signal processor coupled to the receiver and the processor, wherein the signal processor receives the second signal from the receiver and provides the output to the processor, and the output includes the second signal. According to another embodiment, the processor has a comparator that compares the output of the signal processor with a predetermined set of commands to selects the command. According to another embodiment, the signal processor comprises: a filter is coupled to receiver and to the processor, wherein, the filter receives the second signal from the receiver and provides a filtered second signal to the processor; a frequency distributor is coupled to the receiver and to the processor, wherein, the frequency distributor receives the second signal from the receiver and provide the second signal to the processor; and a frequency amplifier coupled to the frequency distributor, wherein the frequency amplifier receives the second signal from the frequency distributor and provided an amplified second signal to the frequency distributor and the frequency distributor provides the amplified second signal to the processor. According to another aspect, the processor includes a monitor that monitors the second signal and in relation the controlled device and generates a new command based on correlation between the second signal and the controlled device operation and stores the new command in a predetermined set of commands. According to yet another embodiment, the processor is configured to deconvolutes the second signal, and deconvoluting includes comparing the filtered second signal, the second signal and the amplified second signal.

According to a further aspect, the subject matter provides a method. The method comprising: broadcasting a first signal from a communication device, wherein the first signal is configured to interact with neural signals and generate a second signal, wherein the second signal includes indicatives of characteristics of the neural signals and wherein the neural signals correspond to instructions to operate a controlled device; and receiving the second signal at the communication device, and strength and range of the first signal and the second signal is independent of neural signals; relaying the second signal from the communication device to a server. According to an embodiment, the method includes receiving an instruction at the communication device from the server to broadcast the first signal. According to an embodiment, the method includes receiving a command from the sever at the communication device, wherein the command is generated by the server based on the second signal and the command is reflective of the instructions to operate the controlled device. According to another embodiment, the method includes causing the controlled device to operate based on the command.

BRIEF DESCRIPTION OF THE DRAWINGS

The subject matter shall now be described with reference to the accompanying figures, wherein.

DETAILED DESCRIPTION

Before the present subject matter is described in further detail, it is to be understood that the subject matter is not limited to the particular embodiments described, as such may, of course, vary. It is also to be understood that the terminology used herein is for the purpose of describing particular embodiments only, and is not intended to be limiting, since the scope of the present invention will be limited only by the appended claims. It must be noted that as used herein and in the appended claims, the singular forms "a", "an", and "the" include plural referents unless the context clearly dictates otherwise.

Figure 1:
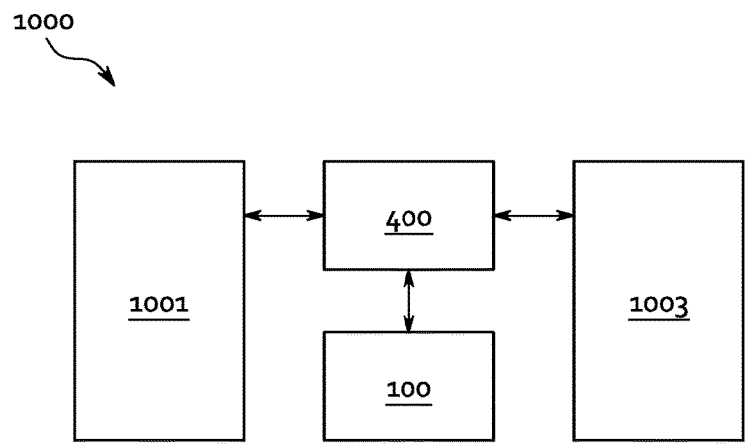
FIG. 1 shows a general block diagram of an embodiment of the present subject matter.

FIG. 1 shows a general block diagram 1000 of an embodiment of the present subject matter. The block diagram 1000 includes a server 100, a communication device 400, a controlled device 1003, and block 1001 is a representative of a brain that generates neural signals.

The subject matter provides solution to a problem wherein, a controlled device 1003 may be operated by cognitive commands. In one embodiment, the present subject matter provides controlling of the controlled device 1003 cognitively, without having to wear any headgear or crown for communicating cognitive commands. In some embodiment, the controlled device 1003 is operated wirelessly. In some embodiments, the communication device 400 is capable of communicating wirelessly. In some embodiments the communication device 400 may include Global System for Mobile (GSM) and Global Positioning System (GPS). In some embodiments, the controlled device 1003 is capable of communicating wirelessly. In some embodiment the controlled device 1003 is coupled to the communication device 400. In some embodiments the controlled device 1003 may include Global System for Mobile (GSM) and Global Positioning System (GPS). In some embodiments, the controlled device comprises a device-processor. The device-processor is capable of receiving commands from the communication device 400, and executing the commands. In some embodiments the device-processor may receive commands from the server 100. In some embodiments, the controlled device 1003 may comprise the communication device 400. In some embodiments, the server 100 may receive the second signal directly from the block 1001 and the controlled device 400 may receive commands directly from the server 100. In some other embodiments, the controlled device 1003 may include, but not limited to, one or more relays, one or more actuators, etc. controlled by the device-processor.

In one example, the controlled device 1003 is coupled to the server 100 through the communication device 400. According to an aspect of the present subject matter the communication device 400 is configured to broadcast a first signal. The first signal is configured to interact with the neural signals and generate a second signal based on interactions with the neural signals. The neural signals may be occurring in brains of a number of persons, however, the communication device 400 may be configured to recognize and record the second signal on which the characteristics of the neural signals of a person whose cognitive commands are required to be executed to operate the controlled device 1003 are registered. This may be achieved by configuring one or both of the server 100 and the communication device 400. In some embodiments the communication device 400 may relay all signals received at the communication device 400 to the server 100 without worrying about whether the second signal received at the communication device 400 or not. The server 100 deciphers relevant the second signal from all the received signals received at the server 100 from the communication device 400. In some other embodiments, the server may decipher the relevant signal based on a password which a user may be required to think before cognitively issuing a command. According one possibility one or both of the server 100 and the communication device 400 may be programmed based on the Electroencephalography (EEG). In this embodiment, the communication device 400 may be configured to capture the second signal which corresponds to the predetermined EEG signal patterns that are already recorded in the communication device 400. In another embodiment, the person may be required to think about a password for cognitively commanding the controlled device 1003. When the second signal which includes characteristics of neural signal that corresponds to the password, only that second signal may be captured by the communication device 400 for further processing at the server 100.

In one embodiment, the server 100 establishes connection between the server 100 and the communication device 400. For example, the server 100 and the communication device 400 may be turned on and the server 100 may scan for the communication device 400 and pair the server 100 with the communication device 400. In some other embodiment, the server 100 may broadcast a command for the communication device 400 to initiate paring of the communication 400 and the server 100. In a further embodiment, the server 100 may broadcast a command to turn on the communication device 400 and initiate paring of the communication 400 and the server 100. The communication device 400 may receive the command from the server 100 and turns itself on. Where the communication device 400 is already turned on the communication device 400 may receive the command from the server 100 for pairing and establishing connection between the server 100 and the communication device 400.

In some other embodiments, the communication device 400 may initiate establishing connection with the server 100. The communication device 400 may send a command to turn on the server 100. The server 100 may receive the command and turn itself on. In one example, this may be achieved by sending a short message (SMS) from the communication device 100. In another example, location based instructions for coupling the communication device 400 and the server 100 may be configured. This may be achieved using a GPS system. In some other embodiment, the communication device 400 may broadcast a command for the server 100 to initiate paring of the communication 400 and the server 100. Whenever the broadcasted signal is received by the server 100 the server 100 may initiate coupling/pairing process. Where the server 100 is already turned on the server 100 may receive the command from the communication device 400 for pairing and establish connection between the server 100 and the communication device 400.

Once a connection between the communication device 400 and the server 100 is established, the server 100 may instruct the communication device 400 to transmit or broadcast the first signal. The communication device 400 receives the instructions to broadcasts the first signal from the server 100. Based on the instructions the communication device 400 may broadcast the first signal. Broadcasted first signal whenever comes under the influence of neural signals of a brain 1001, the first signal gets modified according to the influence of the neural signals, wherein the modifications being reflective of the characteristics of the neural signals. This modified signal is the second signal. The communication device 400 detects for the second signal and receives the second signal. The communication device 400 relays the second signal to the server 100. It shall become clear to a person, after reading this specification, that the server 100 may be configured to broadcast the first signal and receive the second signal without having the communication device 400 as intermediary. However including a communication device 400 such as cell phone or smart watches as intermediary makes the solution of the present subject matter substantially independent of the geo-location and does not require the user, server and the controlled device to be substantially co-located.

Once the second signal is generated and received at the communication device 400, the second signal is passed on to the server 100, where the server 100 analyzes the second signal and determine as to what the user has cognitively commanded and according to the second signal the server 100 generates a command for the controlled device 1003. In one example the command may be transmitted directly to the controlled device 1003, where the device processor of the controlled device 1003 executes the command. In another example, the server 100 passes the command to the communication device 400 which inters instructs the controlled device 1003 to execute the command to cause the controlled device 1003 to operate.

Figure 2:
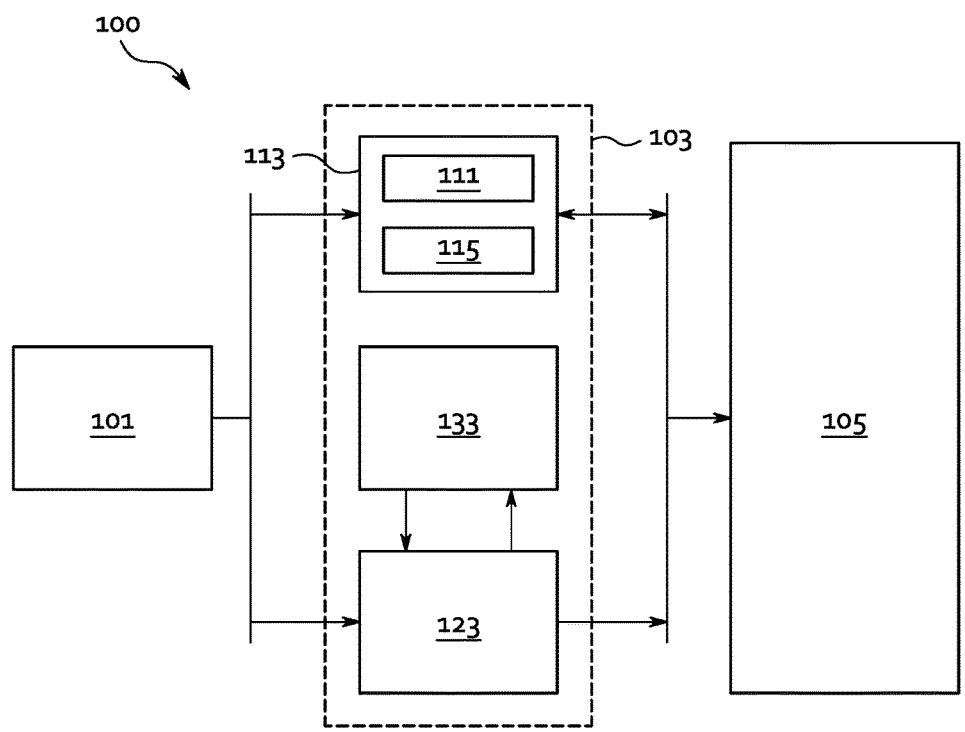
FIG. 2 shows a general block diagram of a server according to an embodiment of the present subject matter.

FIG. 2 shows a more detailed block diagram of the server 100 according to an embodiment of the present subject matter. The server 100 comprises a receiver 101, a signal processor 103, and a processor 105. The signal processor 103 includes a filter 113, a frequency distributor 123, and a frequency amplifier 133. The filter 113 comprises a first frequency oscillator 111, and a first converter 115. The server 100 receives the second signal at the receiver 101. The second signal received at the receiver 101 is supplied to the signal processor 103 and the processor 105.

The processor 105 is configured to include a database. In one embodiment, database stores a number of definitions of acceptable signals for processing. The definitions of the acceptable signals may be generated by taking an EEG of a subject, who desires to cognitively operate the controlled device 1003. It shall become clear to a person in the art, after reading this specification, that while recording the EEG of the subject, the subject may NOT be required to essentially think about the commands that are required to operate the controlled device 1003. It shall further become clear to a person in the art, that the database may be created using techniques other than the EEG. For example, the database may be created by recording nuclear magnetic resonances or other such techniques to record wave emitted by brain.

In one example, where the database is created from the EEG following may be considered. The EEG generally records EEG signals emitted by the brain of a subject, in that it records alpha, beta, theta, delta etc. Samples of the EEG signals may be stored in the database of the processor 105. In some embodiments, the EEG signals may be used to derive a derivative signals from the EEG signal and these derivative signals may be stored in the database of the processor 105. In another embodiment, the EEG signals may be used to determine definition of acceptable signal for processing at the processor 105 and the definitions are stored in the database.

Based on the content stored in the database, the processor determines that a signal received at the receiver 101 is acceptable for processing. In one embodiment, the processor compares the second signal with the contents of the database to determine whether the second signal is acceptable for processing. In another embodiment, the processor processes the second signal to extract a definition and compares the definition with the definitions stored in the database to determine whether the second signal is acceptable for processing.

One of the problems that existing art often face is that, so called, cognitively operated systems are not truly cognitively operated systems because, often these system are not capable of delivering results substantially simultaneously. The present subject matter addresses this problem by providing the filter 113. When the processor 105 determines that the second signals that are being received at the receiver 101 are acceptable signal and correspond to the definitions of the database, the processor may activate the filter 113 to directly pass the second signal for processing. This filtering at the filter 113 helps in increasing speed of processing and thereby providing substantially simultaneous results.

In some embodiment, the filter 113 may augment the line filter 301 (refer to FIG. 3) of the processor 105. In some other embodiments the filter 113 may be independent of the line filter 301. Often the problem associated with the line filter 301 it does not have the capacity to distinguish the second signal and the noise. Some other problem with the line filter 301 is that, when used alone (without augmentation of filter 113) the filter 301 ends up mixing noise into the second signal before passing it to the processor 105, rendering the second signal useless. Therefore, providing the filter 113 that is capable of handling the second signal speeds up the decision making process. The filter 113 is configured to enable passing of the second signal based on the second signal from the receiver 101. The filter 113 comprises the first frequency oscillator 111, and a first converter 115. The second signal is received at the first frequency oscillator 111. The first oscillator 111 oscillates the second signal at a frequency that the processor 105 is cable of processing and provides the oscillated second signal to the first converter 115. The first converter 115 converts the oscillated second signal from analog to digital and sends this to the processor 105. Oscillating the second signal enhances speed and accuracy at the processor 105 as the processor 105 can easily distinguish the filtered signal from the noise.

The signal processor 103 processes the second signal and provides the output of the signal processor 103 to the processor 105. The output of the signal processor 103 includes a number of signals including a filtered second signal, amplified second signal, and the second signal as originally received at the receiver 101. At the signal processor 103, the second signal is provided to the filter 113 and the frequency distributor 123. In some embodiments, the frequency distributor 123 may provide the second signal to the frequency amplifier 133. In some other embodiments, the frequency amplifier 133 may receive the second signal directly from the receiver 101.

In some embodiments, the frequency distributor 123 receives the second signal from the receiver 101. In some other embodiments, the frequency distributor 123 may provide the second signal to the frequency amplifier 133. In some other embodiments, the frequency distributor 123 provides the second signal to the processor 105. In some other embodiments, the frequency distributor 123 receives the amplified second signal from the frequency amplifier 133 and provides both the second signal and the amplified second signal to the processor 105. In some embodiments, the frequency amplifier 123 amplifies the frequency of the second signal by scaling the frequency by a predetermined factor. In some embodiments, the frequency amplifier 133 amplifies the amplitude of the second signal by scaling the amplitude of the second signal by another predetermined factor. In some embodiments the frequency amplifier 133 amplifies both the frequency as well as the amplitude of the second signal.

The frequency amplifier 133 amplifies the second signal and provides the amplified second signal to the processor 105. In some embodiments, the frequency amplifier 133 provides the amplified second signal to the processor 105 via the frequency distributor 123.

The processor 105 receives the output of the signal processor 103. The output of the signal processor 103 also includes the second signal. The processor 105 generates a command based on mapping the output of the signal processor and a predetermined set of commands and selecting the command based on the second signal. The command is reflective of the instructions to operate the controlled device. In some embodiments, the processor may deconvolute the second signal. In some embodiments, deconvoluting includes converting hexadecimal coding of the second signal into binary coding. In some other embodiments, deconvoluting may include comparing the second signal, amplified signal and the filtered signal. In some other embodiments, deconvoluting includes compared the second signal, amplified signal and the filtered signal with contents of the database.

In some other embodiments, the processor 105 is configured to learn new commands and store than in the set of commands, based on observation of the second signal pattern just preceding actions of a subject in relation with the controlled device 1003 (FIG. 1). For example, where a subject turns on a TV, which is one of the controlled device 1003 however the set of commands does not include a command for turning ON the TV, then, the processor updates and includes a command for turning ON the TV corresponding to the second signal pattern received at the server 100 immediately preceding the actions of turning ON of the TV. The processor 105 also configured to redefine commands based on observation. This feature of the present subject matter provides more accurate cognitive operation of the controlled device 1003. In some embodiments, the processor 105 may transmit the command to the communication device 400. In some other embodiment, the processor 105 may transmit the command to the controlled device 1003.

Figure 3:
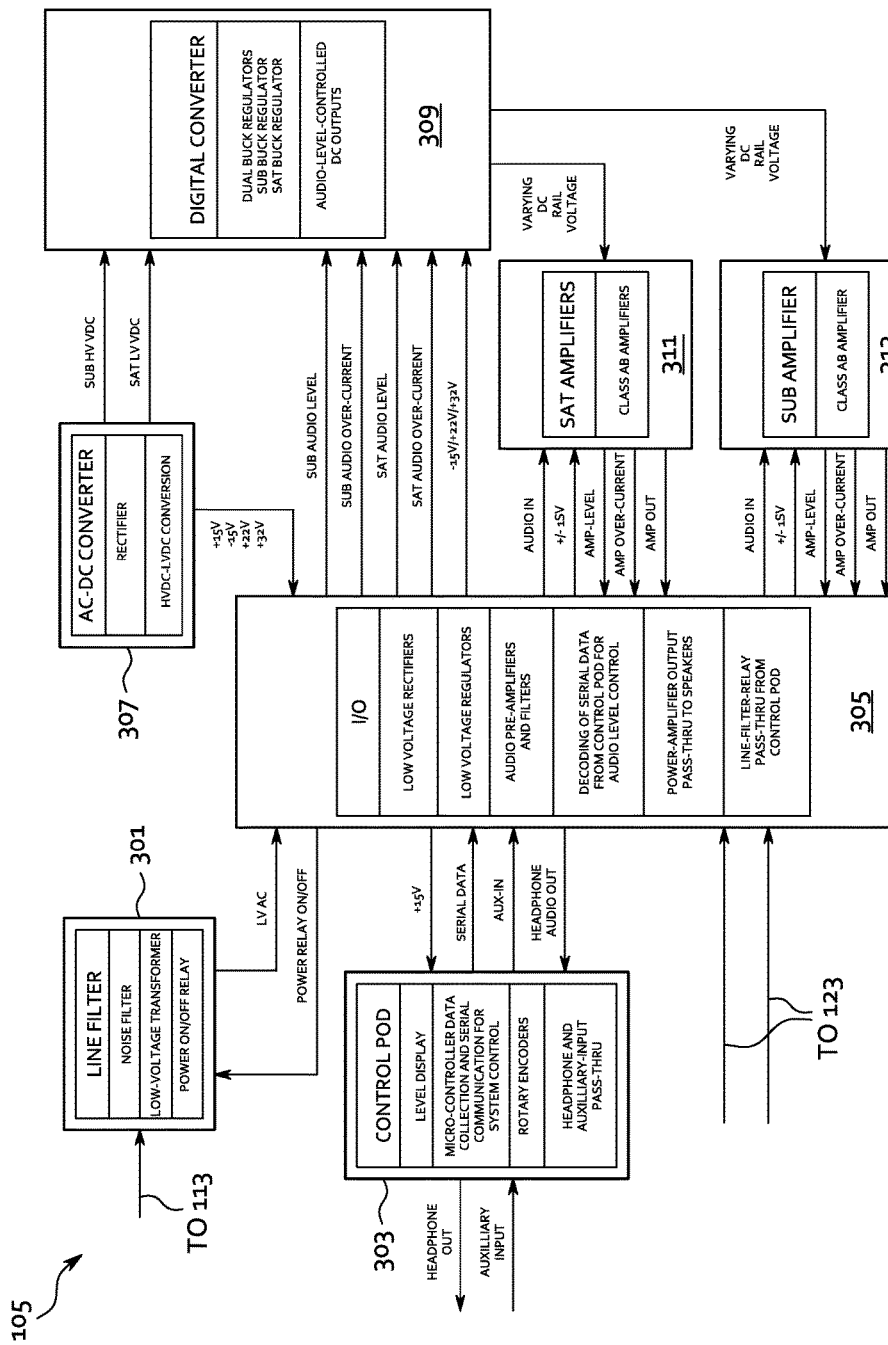
FIG. 3 shows a block diagram of a processor according to an embodiment of the present subject matter.

FIG. 3 shows a more detailed block diagram of the processor 105 according to an embodiment of the present subject matter. The processor 105 includes a line filter 301, a control pod 303, a first microprocessor 305, a rectifier 307, a digital converter 309, a set amplifier 311, and a sub-amplifier 313. The signal processor 103 provides its output to the processor 105. In one embodiment, the output from the filter 113 is received at the line filter 301. The output from the frequency amplifier is received at the first microprocessor 305.

The line filter 301 includes components such as, noise filter, low-voltage transformer, power on/off for the relay. The first microprocessor 305 may includes components such as low voltage rectifier, low voltage regulator, audio pre-amplifier and filters, decoder for serial data from control pod, audio level control, power-amplifier output, pass-thru to speakers, line-filter relay control, pass thru from control pod etc. The rectifier 307 may include an AC-DC converter, a high voltage DC (HVDC)-low voltage DC (LVDC) converter. The digital converter 309 may include a dual buck regulator, a sub buck regulator, a sat buck regulator, audio level controller, DC outputs etc. The set amplifier 311, may include class AB amplifiers, for each channel a class AB amplifier may be provided. Similarly the sub-amplifier 313 may also include class AB amplifier.

Output of the line filter 301 is provided to the first microprocessor 305. The first microprocessor 305 provides turns the relay on or off based to relay the second signal through the filter 113 via line filter 301. The first microprocessor 305 may be configured to turn the relay on or off based on the determination whether the second signal that is being received at the first microprocessor 305 is acceptable for processing or not. In one embodiment, at the processor 105, the line filter 301 receives the input from the filter 113. The line filter 301 passes its output to the first microprocessor 305. The first microprocessor 305 compares the data received from the line filter 301 with the data that is stored in a database of the first microprocessor 305. If the comparison does not result in a match than the processor commands the line filter 301 to disable the relay else the relay is enabled. When the relay is enabled the data is received from the filter 113 into the first microprocessor 305 for further processing. The signal processor 103 also provides input of the frequency distributor 123 and the amplified second signal and the original second signal as received at the receiver to the first microprocessor 305. Further processing of the data received at the first microprocessor 305 is as follow.

Without regards to whether the line filter 301 is enabled or disable, when any data is received at the first microprocessor 305 through the signal processor 103, the first microprocessor 305 sends the data received to the control pod 303. In some embodiments, the first microprocessor 305 may deconvolute the data/the second signal received at the first microprocessor 305. In some embodiments, deconvolution of the data received at the first microprocessor 305 may include comparing the filtered second signal, the amplified second signal and the second signal. In some other embodiments, deconvolution may include decoding the second signal. In some other embodiments, the deconvolution may include converting hexadecimal code for the second signal into a binary code. The control pod 303 may include inputs and output pins for audio video content. The control pod 303 may also include level display. The control pod 303 may also include a data collector and serial converter, for collecting data from the first microprocessor 305. In some embodiments the control pod may also include rotary encoder. The control pod 303 converts data into serial communication and sends it back to the first microprocessor 305. The first microprocessor 305 analyzes the data received from the control pod 303 and compares the data with the data available in the database of the first microprocessor 305. If the comparison results into a match than the first microprocessor 305 passes the data to the digital converter 309. The digital converter 309 converts the data received from the first microprocessor 305 from analog to digital. The converted data from the digital converter 309 is passed to the SAT amplifier 311 and the SUB amplifier 313. The SAT amplifier 311 and SUB amplifier 313 check if the data received from the digital convert is pure enough for further processing, if so, then the SAT amplifier 311 and the SUB amplifier 313 passes the data to the first microprocessor 305. The first microprocessor 305 compares the data with the data available in the database of the first microprocessor 305 and based on the comparison results a command is selected from the database. The command generated is transmitted to the communication device 400.

Figure 4:
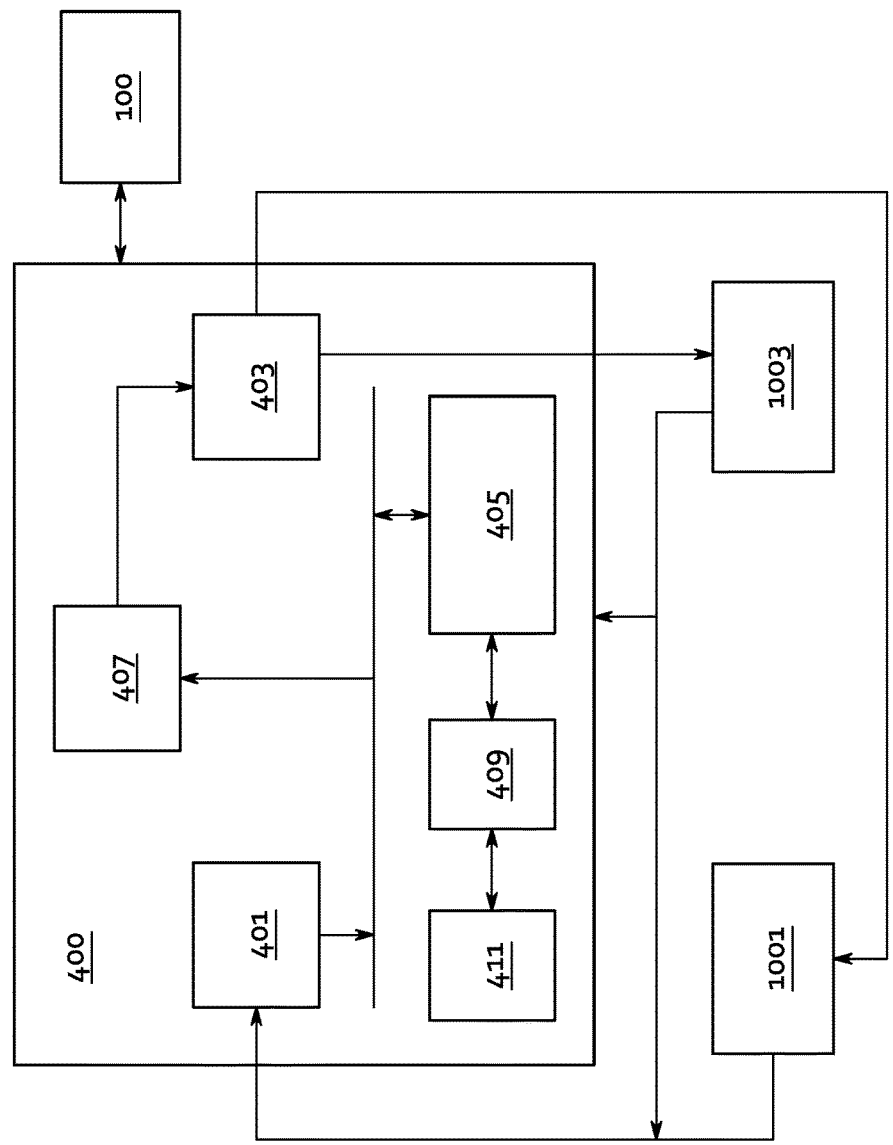
FIG. 4 shows a block diagram of a communication device according to an embodiment of the present subject matter.

FIG. 4 shows a block diagram of the communication device 400 according to an embodiment of the present subject matter. The communication device includes a first receiver 401, a transmitter 403, a frequency changer 407, a second microprocessor 405, a GSM module 409, and an amplifier shield 411.

The communication device 400 receives at the receiver 401, an instruction from the server 100 to broadcast the first signal. In one embodiment, the server 100 issues the instructions along with the first signal to the communication device 400. The communication device 400 receives the first signal from the server 100 and relays the first signal through the transmitter 403. In one embodiment, the first signal received from the server 100 is sent to the second microprocessor 405 and the second microprocessor 405 sends the first signal to the frequency changer 407. In some other embodiments, the server 100 sends the instructions to the second microprocessor 405 along with information regarding the first signal and the second microprocessor 405 based on the information received generates the first signal and send the first signal to the transmitter 403. For example, the instructions send by the sever 100 includes information regarding frequency of the first signal. In some other embodiments, the information may include other characteristics of the first signal. In some other embodiments, the second microprocessor 405 sends the first signal to the transmitter 403 through the frequency changer 407. The general job of the frequency changer 407 is to alter the frequency of the signal received from the second microprocessor 405 in such a manner that the transmitter 403 can handle that frequency. In some embodiment, the first signal received from the server 100 may bypass the frequency changer 407 based on the characteristics of the first signal. For example, the frequency of the first signal is such that it does not require any alteration in such case the first signal may bypass the frequency changer 403. In another example, when the frequency of the first signal is such that the frequency changer 403 cannot handle such frequency at all, the frequency changer 403 may be by-passed.

Once the transmitter 403 transmits or broadcasts the first signal. The characteristics of the first signal is selected such that it gets modified when it interacts or comes under the influence of neural transaction or the neural signals that happening between the neuron of the brain. The interaction between the first signal and neural signals and/or neural transaction alters the characteristics of the first signal resulting into a new signal, the second signal. A general analysis of the first signal and the second signal may result in information regarding the type of neural transaction have taken place in a brain, and/or regarding the type of neural signals the first signals has interacted with.

The receiver 401 of the communication device 400 is configured to detect and receive the second signal. The communication device 400 is configured to forward/relay the second signal received at the receiver 401 to the server 100 through the transmitter 403. In one embodiment, the second signal is sent to the frequency changer 407. In some other embodiments, the second signal by-passes the frequency changer 407—as discussed above, with reference to the first signal—and goes to the transmitter 403 for transmission to the sever 100. The server 100 based on the second signal generates a command and transmits the command to the communication device 400. The generation of commands at the server 100 is discussed in detailed in the preceding discussion.

The communication device 400 receives the command from the server 100 through the receiver 401. The commands are sent to the second microprocessor 405. The second microprocessor 405 sends the command to the frequency changer 407. The frequency changer 4007,—according to the instructions of the second microprocessor 405—converts the characteristics of the command in a manner that the command is acceptable to the controlled device 1003. In one example, the frequency changer 407 may change the frequency of the command that may be communicated over a wifi network. In some other embodiments, the frequency may be altered to a frequency that may be communicated over the Bluetooth network. In some embodiments, the command may be modified for relaying using an optical fiber. In some other embodiments, the command may be modified for transmission over wired lines. In some other embodiments, where the controlled device is remotely located, the second microprocessor 405 may send the command to the GSM module 409 and the GSM module 409 sends the command to the amplifier shield 411 where the command is amplified and sent back to the GSM module 409. The GSM module 409 may then communicate the command to the controlled device 1003 through a GSM network.

The controlled device 1003 receives the command from the communication device 400. In some embodiments, the controlled device 1003 is configured to receive the command over the wireless networks such as Bluetooth, wifi, GMS, CDMA, etc. In some other embodiment the controlled device 1003 may be configured to receive the command over a wired network. The controlled device 1003 generally includes a device processor which converts the command into a machine language which results in actions upon execution. In some examples, the controlled device 1003 includes motors controlled by the device processor. In some other embodiments, the controlled device may include a relay or actuators controlled by the device processor.

Figures 5, 6:
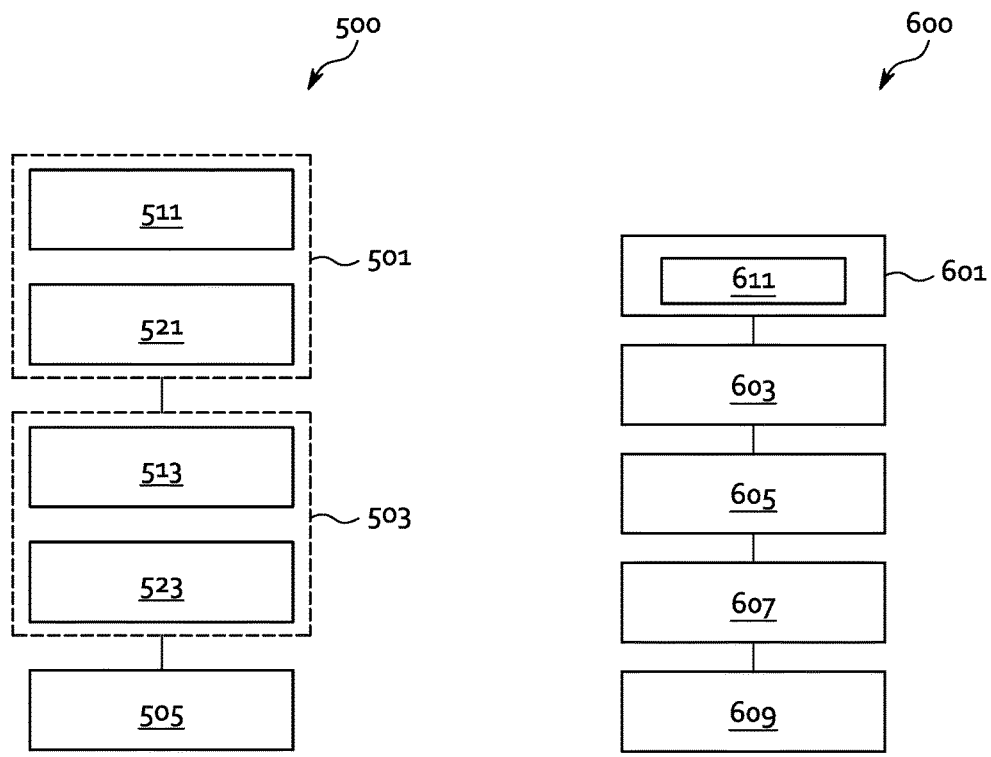
FIG. 5 shows a block diagram of a method performed at a server according to an embodiment of the present subject matter.
FIG. 6 shows a method performed at a communication device according to an embodiment of the present subject matter.

FIG. 5 shows a block diagram 500 of a method performed at a server according to an embodiment of the present subject matter. The method 500 provides block 501. At block 501, a second signal is received at a server. The second signal is a result of interaction of neural signals and a first signal, and the second signal includes indicative of characteristics of the neural signals, and the neural signals correspond to instructions to operate a controlled device. In some embodiment, the block 501 includes a block 511. In some embodiment the second signal may be received from a communication device and at block 511 the communication device may be instructed by the server to broadcast the first signal. The first signal is configured to interact with neural signals and register indicatives of the characteristics of the neural signals on the first signal to generate the second signal and strength and range of the first signal and the second signal is independent of neural signals. In some embodiments, the block 501 may include a block 521. At block 521 a filtered second signal, the second signal and an amplified second signal may be received at a processor of the server. The method further includes a block 503. At block 503 a command is generated based on the second signal and the command is reflective of the instructions to operate a controlled device. In some embodiments, the block 503 may include a block 513. At block 513 the method provides deconvoluting the second signal at the processor. In some embodiments the deconvoluting includes comparing the filtered second signal, the second signal and the amplified second signal. In some embodiment, the block 503 includes a block 523. At block 523 the command may be generated by mapping the second signal to a predetermined set of commands and selecting the command based on the second signal. The method 500 further provides a block 505. At block 505 the command is transmitted to cause the controlled device to operate. In some embodiments, at block 505 the command may be transmitted to the controlled device. In some other embodiments, the command may be transferred to the controlled device through the communication device.

FIG. 6 shows a block diagram 600 of a method performed at a communication device according to an embodiment of the present subject matter. The method 600 provides at block 601 a first signal from a communication device may be broadcasted. The first signal is configured to interact with neural signals and generate a second signal. The second signal includes indicatives of characteristics of the neural signals and the neural signals correspond to instructions to operate a controlled device. In some embodiments, the block 601 may include a block 611. At block 611 instructions may be received at the communication device to broadcast the first signal. In some embodiments, a server instructs the communication device. At block 603 the second signal maybe received at the communication device. The strength and range of the first signal and the second signal is independent of neural signals. At block 605 the communication device may transmit the second signal. In some embodiments, the communication device transmits the second signal to the server. At block 607 the communication device may receive a command from the server. The command is generated by the server based on the second signal and the command is reflective of the instructions to operate the controlled device. According to another embodiment, the method 600 includes a block 609. At block 609, the communication device may cause the controlled device to operate based on the command. In some other embodiment, the block 605 the communication device may cause the controlled device to operate by transmitting the command to the controlled device.

While the subject matter may be susceptible to various modifications and alternative forms, specific embodiments have been shown by way of example in the drawings and have been described herein. Alternate embodiments or modifications may be practiced without departing from the spirit of the present subject matter. The drawings shown are schematic drawings and may not be to the scale. While the drawings show some features of the subject matter, some features may be omitted. Alternatively, in some other cases some features may be emphasized while others are not. Further, the methods disclosed herein may be performed in manner and/or order in which the methods are explained. Alternatively, the methods may be performed in manner or order different than what is explained. However, it should be understood that the subject matter is not intended to be limited to the particular forms disclosed. Rather, the subject matter is to cover all modifications, equivalents, and alternatives falling within the spirit and scope of the subject matter as defined by the following appended claims.

What is claimed is:

1. A method comprising:
   receiving a second signal at a server, wherein the second signal is a result of interaction of neural signals and a first signal, wherein the first signal is broadcasted from a communication device and the first signal is configured to interact with the neural signals and the second signal includes indicative of characteristics of the neural signals, and the neural signals correspond to instructions to operate a controlled device;
   generating a command based on the second signal, and the command is reflective of the instructions to operate the controlled device; and
   transmitting the command configured to operate the controlled device.

2. The method of claim 1, wherein the receiving further comprises receiving the second signal from the communication device, and
   the method further comprises instructing the communication device to broadcast the first signal,
   wherein the server instructs the communication device and the first signal is configured to interact with neural signals and register indicatives of the characteristics of the neural signals on the first signal to generate the second signal and strength and range of the first signal and the second signal is independent of neural signals.

3. The method of claim 1, wherein the receiving further comprises receiving at a processor of the server, a filtered second signal, the second signal and an amplified second signal.

4. The method of claim 1, further comprising:
   monitoring the second signal and in relation the controlled device;
   generating a new command based on correlation between the second signal and the controlled device operation; and
   storing the new command in a predetermined set of commands.

5. The method of claim 1, wherein generating the command further comprises mapping the second signal to a predetermined set of commands and selecting the command based on the second signal.

6. A server comprising:
   a receiver configured to receive a second signal, wherein the second signal is a result of interaction of neural signals and a first signal, wherein the first signal is broadcasted from a communication device and the first signal is configured to interact with neural signals and the second signal includes indicatives of characteristics of the neural signals, and the neural signals correspond to instructions to operate a controlled device;
   a processor to generate a command based on the second signal, wherein the command is reflective of the instructions to cause the controlled device to operate; and
   a transmitter to transmit the command to cause the controlled device to operate.

7. The server of claim 6 wherein, the processor configured to receive the second signal from the communication device and the processor instructs the communication device to broadcast the first signal,
   wherein the first signal is configured to interact with neural signals and register indicatives of the characteristics of the neural signals on the first signal to generate the second signal and strength and range of the first signal and the second signal is independent of neural signals.

8. The server of claim 6, wherein the server includes a signal processor coupled to the receiver and the processor, wherein the signal processor receives the second signal from the receiver and provides the output to the processor, and the output includes the second signal.

9. The server of claim 8, wherein the processor has a comparator that compares the output of the signal processor with a predetermined set of commands to selects the command.

10. The server of claim 8, wherein the signal processor comprises:
    a filter is coupled to receiver and to the processor, wherein the filter receives the second signal from the receiver and provides a filtered second signal to the processor;
    a frequency distributor is coupled to the receiver and to the processor, wherein the frequency distributor receives the second signal from the receiver and provide the second signal to the processor; and
    a frequency amplifier coupled to the frequency distributor, wherein the frequency amplifier receives the second signal from the frequency distributor and provided an amplified second signal to the frequency distributor and the frequency distributor provides the amplified second signal to the processor.

11. The server of claim 6, wherein the processor includes a monitor that monitors the second signal and in relation the controlled device and generates a new command based on correlation between the second signal and the controlled device operation and stores the new command in a predetermined set of commands.

12. A method comprising:
broadcasting a first signal from a communication device, wherein the first signal is configured to interact with neural signals and generate a second signal, wherein the second signal includes indicatives of characteristics of the neural signals and wherein the neural signals correspond to instructions to operate a controlled device;
receiving the second signal at the communication device, and strength and range of the first signal and the second signal is independent of neural signals; and
relaying the second signal from the communication device to a server.

13. The method of claim 12, the method further comprises receiving an instruction at the communication device from the server to broadcast the first signal.

14. The method of claim 12, the method further comprises receiving a command from the sever at the communication device,
wherein the command is generated by the server based on the second signal and the command is reflective of the instructions to operate the controlled device.

15. The method of claim 12, wherein the method further comprises causing the controlled device to operate based on the command.

\* \* \* \* \*